(No Model.)

R. P. CURTIS.
PIPE THREADING MACHINE.

No. 477,297. Patented June 21, 1892.

WITNESSES:

INVENTOR
R. P. Curtis
BY
ATTORNEY

UNITED STATES PATENT OFFICE.

RODERICK P. CURTIS, OF SOUTHPORT, ASSIGNOR TO CURTIS & CURTIS, OF BRIDGEPORT, CONNECTICUT.

PIPE-THREADING MACHINE.

SPECIFICATION forming part of Letters Patent No. 477,297, dated June 21, 1892.

Application filed July 30, 1891. Serial No. 401,209. (No model.)

*To all whom it may concern:*

Be it known that I, RODERICK P. CURTIS, a citizen of the United States, residing at Southport, in the county of Fairfield and State of Connecticut, have invented certain new and useful Improvements in Pipe-Threading Machines; and I do hereby declare the following to be a full, clear, and exact description of the invention, such as will enable others skilled in the art to which it appertains to make and use the same.

My invention relates to pipe-threading machines, but particularly refers to that class of such machines which embody in their structure a toothed die-carrying ring, a lead-screw rigid with said ring, a lead-block engaging with said screw, and a pinion which meshes with the teeth on the ring to impart to the latter a rotary movement.

In machines of this description the ring has generally been supported within a casing, the latter affording a circumferential bearing for said ring; but my present invention refers only to pipe-threading machines wherein the die-carrying ring has no peripheral bearing.

Figure 1:
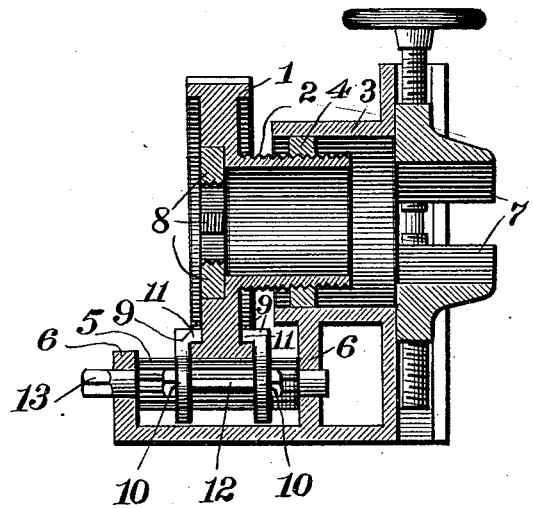
Figure 2:
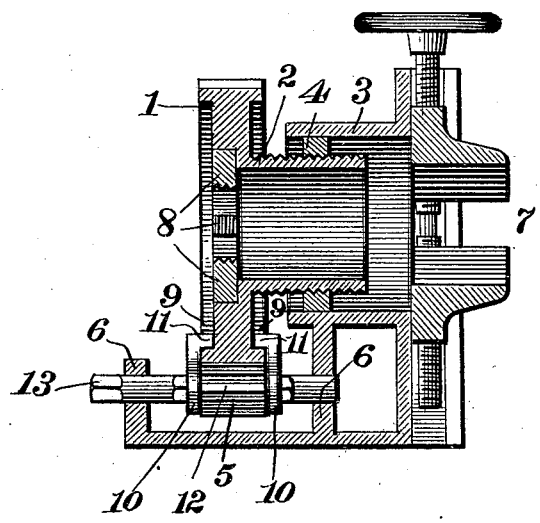

In the accompanying drawings, Figures 1 and 2 are sectional elevations illustrating different ways of carrying out my invention.

Similar numbers of reference denote like parts in both figures.

1 is a toothed die-carrying ring having a lead-screw 2 rigid therewith and extending rearwardly therefrom; 3, a box within which lead-blocks 4 are secured in any ordinary manner, with which blocks said screw engages; 5, a pinion journaled in the frame 6 and meshing with the teeth on the ring, and 7 is an ordinary vise secured in position at the rear of the box, and by means of which the pipe to be threaded is clamped.

In threading pipe it will be obvious that the strain on the ring during the effective action of the dies 8 will tend to thrust the ring at right angles to its axis, which thrust is sustained wholly by the bearing-point of the screw and block. This follows because said ring has no circumferential bearing, and the same is true of all machines of this nature, the die-carrying rings whereof are mounted on a spindle, which latter slides within bearings. The lead screw and block are not essentially identified with the machines to which my invention applies, since the ring may be forced inward by hand until the dies take hold of the pipe, and I have merely shown a lead-screw and lead-blocks, because they are preferably employed in pipe-threading machines. Therefore, whether a plain spindle or a lead-screw is supported within bearings in the box 3, the thrust of the ring exerts a great strain on the bearings, owing to the fact that the ring operates as a lever against said bearings. The result of this is that the bearings and spindle or screw become so worn in a short time that the machine is rendered useless.

My invention aims to relieve the bearings and spindle, and will be best understood from the following description.

Referring to Fig. 1, the pinion 5 is elongated and the ring 1 slides thereon. Annular recesses 9 are in the sides of the ring, and keepers 10 snugly encircle the pinion and have lugs 11, which extend within said recesses. The keepers are secured together by a bolt 12. The keepers slide with the ring, and any thrust of the latter at right angles to its axis is resisted radially by the pinion.

In Fig. 2 the pinion is not elongated, but is splined to its shaft 13, and the keepers encircle the latter on opposite sides of the pinion, the ring, keepers, and pinion sliding in harmony.

The keepers do not interfere with the rotation of the ring and pinion, and at the same time unite said parts rigidly as regards any movement or lateral thrust at right angles to their axes.

I claim—

1. In a machine of the character described, the combination, with the toothed die-carrying ring capable of a sliding movement in a direction parallel to its axis, and the pinion engaging the same, whereby rotation is imparted to said ring, of a keeper which slides in harmony with said ring and secures the latter rigid to the pinion as to movement in a direction at right angles to the axis of said ring, substantially as set forth.

2. In a pipe-threading machine embodying in its organization a toothed die-carrying ring mounted on a rotatory spindle, which latter is journaled in suitable bearings, and a pinion whereby said ring is rotated, the combination, with said ring and pinion, of a keeper which secures said ring and pinion rigidly together as to movement in a direction at right angles to their axes, substantially as shown and set forth.

In testimony whereof I affix my signature in presence of two witnesses.

RODERICK P. CURTIS.

Witnesses:
J. S. FINCH,
F. W. SMITH, Jr.